United States Patent Office.

JOHN M. MULLER, OF COBLESKILL, NEW YORK.

*Letters Patent No.* 50,945, *dated November* 14, 1865; *reissue No.* 2,596, *dated May* 7, 1867.

IMPROVEMENT IN TANNING.

The Schedule referred to in these Letters Patent and making part of the same.

TO ALL WHOM IT MAY CONCERN:

Be it known that I, JOHN M. MULLER, now of Cobleskill, in the county of Schoharie, State of New York, but formerly of North Becket, in the county of Berkshire, and Commonwealth of Massachusetts, have invented a new and useful Process of Tanning Hides; and I do hereby declare that the following is a full, clear, and exact description thereof, The first part of my invention consists in making a strong ooze of yarrow and black birch bark, or willow bark, in which liquor the hides are to lie for about ten days, and handled every day. The liquor is again strengthened, and the hides subjected to it for the space of ten days more, at which time the tanning will be complete. For one hundred sides I take one-half of a cord of black birch bark, and a similar quantity of willow bark, to which are added about five hundred pounds of yarrow. These substances can be leached several times in warm water, to obtain the full benefit of the tanning principle in them, which will make the liquor strong enough for ten days tanning, after which the liquor should be strengthened again by another leaching.

The second part of my invention consists in subjecting stuffed hides or leather to the action of a steam bath, as follows:

I take a strong solution of an ooze made from the same substances which I employ in the previous process of tanning, or other astringent liquors, and place the same in a suitable vessel, and raise it to a temperature, say of 140°, or thereabouts, and then dip the hides, after they have been properly stuffed and dried, into it, allowing them to remain from five to fifteen seconds, more or less, according to the texture and condition of the leather. The object of this second treatment is to cause a thorough permeation of the leather by the tallow or grease which is applied in the process of stuffing or rubbing. The steam acting upon the stuffed leather, will not only strike in the grease, but it will also close up the pores of the leather, and render it water-proof, and at the same time soft and pliable. The steaming process may also be conducted in a tight vessel of such capacity as to contain a considerable number of hides, and this treatment will be found very beneficial to leather which has not been previously stuffed, for increasing its solidity and durability.

I do not confine my invention to the precise proportions of the ingredients herein mentioned for tanning the hides, nor to the length of time stated for completing the tanning process. I have found the proportions herein stated to work well and to make very good leather, but other proportions may be found to answer equally as well. With regard to the process of steaming the skins after they have been tanned, I will state that the hides may be tanned in the usual manner, by any of the known tanning compounds or liquors, and the tanned skins may be "stuffed" or not, previously to subjecting them to the steam bath.

Having thus described my process of tanning hides, what I claim as new and of my invention, and desire to secure by Letters Patent, is—

1. A tanning ooze, which is made from the ingredients herein mentioned, and combined in about the proportions set forth.
2. The combination and use of yarrow with other astringent substances for making an ooze for tanning.
3. Subjecting stuffed or unstuffed skins or leather to the action of a steam bath substantially as described.

JOHN M. MULLER. [L. S.]

Witnesses:

STANTON COURTER,

GEO. D. STANLEY.